United States Patent Office 2,864,714
Patented Dec. 16, 1958

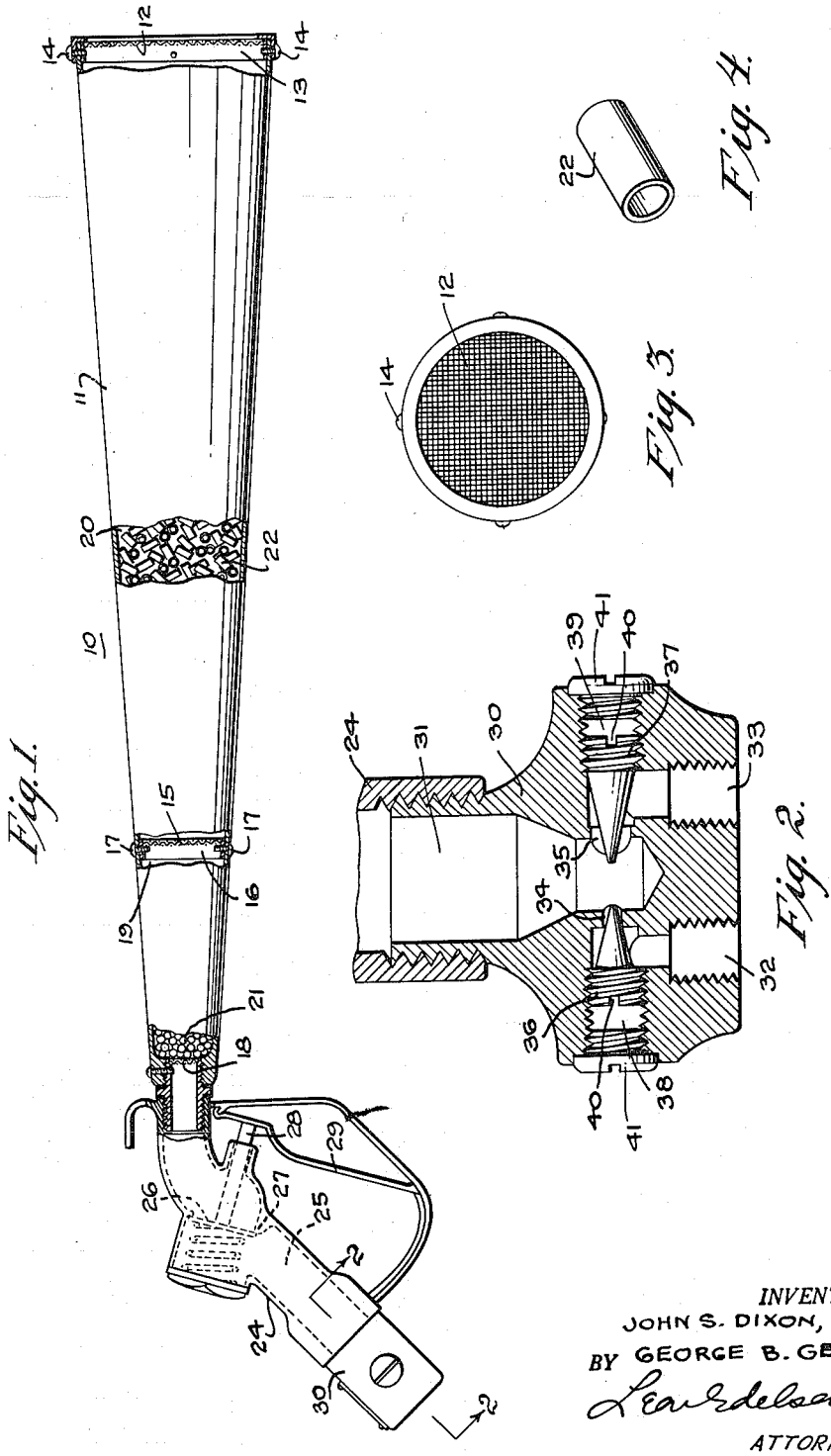

2,864,714

METHOD OF PRODUCING AERATED CEMENTITIOUS MATERIAL

John S. Dixon, Jr., Haverford, Pa., and George B. Geyer, Wildwood, N. J., assignors to National Foam System, Inc., West Chester, Pa., a corporation of Delaware Application February 9, 1954, Serial No. 409,045

4 Claims. (Cl. 106—88)

The present invention relates generally to cementitious building materials and more particularly to the aeration of such material by the use of pre-formed foam to render the same cellular in structure and correspondingly light in weight.

In recent years there has been an increasing trend toward the use of lightweight concrete in the building industry. Lightweight concrete not only reduces the dead weight of completed structures, saves both in labor and materials, but adds a substantial insulating value. One of the least expensive and most easily controlled methods of producing lightweight concrete is by the use of pre-formed foam which is added to a concrete mix after all other ingredients have been handled and mixed in the usual manner.

Among the principal objects of the present invention is to provide an apparatus for the mechanical production of preformed foam which is especially suitable for introduction in the concrete mix and which consists of tiny, tough air cells that are highly stable and do not collapse even under the mixing action of the coarsest aggregate employed in the concrete mix. These air cells, in individually intact form, are uniformly dispersed throughout the concrete mix, remain permanently embedded in the concrete-forming mass during mixing, pouring and setting thereof, and produce a final lightweight cellular product adapted to be easily sawed or nailed.

By using preformed foam, concrete of almost any desired density may be readily made in the precast plant or for poured-in-place structures. Thus, it is possible to produce a concrete for any specific use, such as a 20 lb. per cubic foot material for insulating purposes, or a 70–100 lb. load bearing, reinforced product using any of the many aggregates available.

The introduction of preformed mechanical foam into the concrete mix in accordance with the principles of the present invention imparts thereto unusual lubricating properties with such resulting increase in the fluidity of the concrete as to enable it to completely fill the cavities of molds designed for the casting of concrete structures of the most intricate shape. Also, such increased fluidity not only increases the facility with which the concrete mix may be pumped into forms, thereby effecting substantial savings in labor ordinarily required for poured concrete work, but also enables the concrete to flow easily around reinforcing without producing any undesired air pockets or damming up of the concrete in the immediate vicinity of the reinforcing, thus resulting in a reinforced concrete structure of maximum strength.

The lightweight aerated concrete produced in accordance with the procedure and by the apparatus of the present invention may employ, with or without aggregate, any suitable cementitious material, such as Portland or any high early-strength cement, gypsum, clay and other powdered materials which will solidify by chemical action or by drying after having been made plastic with water. Since the preformed foam introduced into the cementitious mix does not result in any expansion of the mix after the same is poured or injected into the form or mold therefor and does not impair the normal setting rate thereof, the foamed mass may be used immediately after it has been mixed and it may be stripped from its form or mold within 24 hours or less.

Tests have shown that the foamed concrete of the present invention has an insulating value many times greater than that of ordinary concrete and because of this and its fire resistant property, such foam is ideal for use as subflooring, wall fill, roofing and as a covering for underground piping.

The production of preformed foam pursuant to the present invention and its introduction into a cementitious mix containing calcium silicate forming compounds makes possible autoclave heating of such mixes for producing a final product having a greatly increased structural strength and an exceptionally low water movement, with almost complete resistance of the product to the deleterious effects of freezing and thawing. Even where the product is of low density, as where it is designed purely for insulation, and is not autoclaved, it is of greater strength and less expensive to produce than other materials of comparable insulating value.

Having in mind all of the foregoing, it is among the objectives of the present invention to provide for the economical and efficient production of mechanical foam which may be easily and effectively introduced in preformed state into the concrete mix to aerate the same and produce a final cellular product having the desired properties hereinabove recited.

Other objects and advantages of the invention will appear more fully hereinafter, it being understood that the present invention consists substantially in the combination, construction, location and relative arrangement of parts of the apparatus for production of the desired preformed foam, and in the procedure for production and use thereof, all as described in detail hereinafter, as shown in the accompanying drawings and as finally pointed out in the appended claims.

In the accompanying drawings:

Figure 1 is a side elevational view, with certain parts thereof shown in section, of a device for producing and discharging foam suitable for introduction into a concrete mix for aerating and rendering the hardened concrete cellular in structure;

Figure 2 is a sectional view as taken along the line 2—2 of Figure 1;

Figure 3 is an end elevational view of the foam discharge end of the device shown in Figure 1; and Figure 4 is a perspective view on an enlarged scale of one of the tubular elements contained in the foam discharge nozzle for effecting minute subdivision and reduction in discharge velocity of the foam delivered from the nozzle.

In the production of the lightweight, cellular concrete in accordance with the principles of the present invention, any suitable concrete mix of conventional formula may be employed, it being generally customary to use about six gallons of total water for each 100 pounds of cement in the mix. The cement, water and aggregate, if any, are first thoroughly mixed together, immediately following which there is added to the mix the required amount of preformed foam. The foam is dispersed as uniformly as possible throughout the concrete mix by continuing the mixing operation for from one to three minutes after introduction of the foam, whereupon the foamed concrete mix is ready to be poured, injected or otherwise introduced into suitably prepared forms or molds in which the concrete hardens and sets to the shape determined by the form or mold used as will be well understood.

Inasmuch as the foam employed is completely preformed prior to its introduction into the concrete mix, no expansion of the prepared concrete mix occurs within its containing form or mold and consequently the concrete mix may be employed immediately after the required amount of foam has been incorporated therein.

The requisite foam is produced by intimate admixture of air with a premixed solution of a suitable foam-forming liquid, which air and liquid are both delivered to a mixing head under suitable pressure and from which they issue for conjoint traverse through a myriad of tortuous paths which insure most intimate mingling of the foam-forming liquid and air to produce foam having such substantial expansion (gallons of foam produced per gallon of foam-forming solution) as to form extraordinarily stable foam bubbles of exceedingly small diameter.

The premixed foam-forming liquid preferably is of the type produced by alkaline hydrolysis of animal proteinaceous material, of which a hydrolysate is prepared by suitable admixture of caustic soda and lime acting as a hydrolyzing agent. A hydrolysate satisfactory for the production of foam to be incorporated in a concrete slurry may be prepared in accordance with the following procedure, it being understood that the present invention is not intended to be limited to the use of any particular proteinaceous foam-producing liquid:

To 2600 gallons of water heated to from 190° to 200° F. is added 2600 pounds of a suitable animal proteinaceous material, the mixture being stirred for some ten minutes. To this mixture there is first added 450 pounds of lime and then 35 pounds of sodium hydroxide, to initiate a hydrolysis which is continued for about 7 hours at the above stated temperature. Thereafter there is added to the hydrolysate about 50 gallons of concentrated sulphuric acid and the pH thereof adjusted to exactly 4.0. This acidified hydrolysate is then heated, at the above temperature, for an additional hour, during which it is continuously stirred, and thereupon its pH is raised to 7.6 by the addition of approximately 50 pounds of lime.

The hydrolysate so produced is then filtered and evaporated to a specific gravity of 1.195 to provide a liquid yield of about 465 gallons, to which liquid is then slowly added with stirring over a period of about 20 minutes an aqueous solution of ferrous sulfate made up of 132 pounds of ferrous sulfate dissolved in 30 gallons of hot water.

To each 100 gallons of this final hydrolysate, heated to 120° F. and having a specific gravity of 1.170, is then added, with constant stirring, a calcium chloride solution compounded of 100 pounds of calcium chloride hexa-hydrate, 10 gallons of isopropyl alcohol and 4 gallons of water, the mixing of which in the hydrolysate is continued for one hour followed by filtering to produce the final foam-forming liquid.

While the foam-forming liquid prepared as just described is soluble in water, when it is foamed to a high energy level by the means to be described hereinafter to produce foam of high expansion and exceedingly small bubble size, the proteinaceous content of such foam does not revert to solution state, due most probably to the denaturizing effect produced on the protein constituents of the foam-forming liquid by the high energy foaming treatment to which it is subjected and to the stabilizing effect which is imparted to the foam bubbles by the calcium chloride solution incorporated in the foam-forming liquid.

The water-soluble foam-forming liquid produced as above described or otherwise to form stable foam of optimum expansion, preferably ranging from 15 to 30 gallons of foam per gallon of foam-forming solution, is combined with water in the preferred ratio of 1 part of the liquid to 50 parts of water and the foam-forming solution so prepared is charged into a suitable supply tank which is air pressurized to provide for discharge of the solution from the tank at a nozzle discharge pressure of 80 p. s. i., the tank being provided with a suitable discharge hose which is adapted to be suitably connected to the foam-producing and discharge device 10 shown in the accompanying drawing.

Referring more particularly to Figures 1 and 2 of this drawing, it will be observed that the device 10 generally comprises a foam delivery tube 11 the circular cross-section of which is of gradually increasing diameter toward its outer or foam discharge end. Fitted in this discharge end of the tube 11, is a bronze wire screen 12, preferably twelve mesh, this screen being suitably retained in an annular ring 13 which is secured internally of the tube by screws 14. A second similar wire mesh screen 15, of smaller diameter, and also retained in an annular ring 16, is likewise secured internally of the tube 11 by screws 17, this second screen 15 being disposed well toward the reduced end of the tube, while a still smaller diameter screen 18 is suitably secured in the reduced end of the tube 11. Thus, this tube is provided with two axially spaced compartments 19 and 20 of considerably different volumetric sizes, the smaller compartment 19 formed between the screens 18 and 15 extending along only a minor portion of the tube length while the larger compartment 20 formed between the screens 15 and 12 extends along the major length of the tube. The two compartments, of course, are in free communication with each other by way of the openings in the intermediate screen 15.

Closely packed in the smaller compartment 19 and confined between the screens 18 and 15 are a plurality of glass or ceramic beads 21 of a diameter just large enough to prevent their passage through the openings in the confining screens, while similarly packed in the larger compartment 20 and confined between the screens 15 and 13 are a plurality of tubular glass or ceramic elements 22, one of which is shown on a greatly enlarged scale in Figure 4. These latter elements 22, sometimes referred to as Raschig rings, are so indiscriminately disposed within the tube compartment 20 that their axes present in all directions relatively to the longitudinal axis of the foam delivery tube 11. It will be apparent, also, that the voids present between the compacted tubular elements 22 are of random size and disposition and are individually greater than the more or less uniformly disposed voids formed between the closely packed beads 21 of the tube compartment 19.

Secured to the reduced end of the foam delivery tube 11 is a valve controlled mixing head for air and foam-forming solution delivered to the tube 11, this head being desirably in the form of a handle part 24 having a passage 25 therethrough which communicates with the inlet end of the tube by way of a connecting nipple 26 between the tube and the handle part. The passage 25 may be controlled by a suitably spring-pressed valve 26 operating against a valve seat 27. Preferably, to facilitate control of the air-liquid mixture passing through the passage 25, the valve 26 may be provided with a valve stem 28 which projects through the handle part 24 and engages a hand-operated actuating lever or strap 29 operatively associated in any suitable manner with the handle part 24.

Fitted in the outer end of the handle part 24 is a mixing valve unit 30 having a discharge passage 31 in free communication with the valved passage 25 through the handle part and a pair of inlet passages 32 and 33 which respectively communicate with the discharge passage 31 by way of a pair of orifices 34 and 35. The orifices 34 and 35 are respectively regulated in effective size by individually adjustable needle valves 36 and 37 suitably threaded into tapped bores 38 and 39 formed in opposite sides of the mixing unit, these needle valves being each kerfed, as at 40, to permit their ready adjustment by means of a screwdriver or the like. Preferably, the outer ends of the needle valve bores are each closed by a removable plug 41.

The inlet passage 32 is connected by way of a hose or conduit (not shown) to a suitable source of air pressure supply, while the inlet passage 33 is likewise connected to the foam-forming solution under pressure in the tank above mentioned. Both the air and the foam-forming solution are delivered to the mixing valve unit 30 under substantially equal pressures, ordinarily at 80 pounds per square inch nozzle pressure, and the needle valves 36 and 37 are adjusted to provide the proper ratio of air to foam-forming liquid for the production of foam of the requisite expansion, which may range from 10 to 40 gallons of foam for each gallon of solution delivered to the mixing head. Ordinarily, for an ideal lightweight concrete the optimum expansion may range from 15 to 30. It will be understood that by varying the expansion, the cell structure of the finished concrete product may be correspondingly varied. Thus, where it is desired to provide the concrete with high acoustical properties, a large celled structure may desirably be produced by the introduction of foam of relatively low expansion into the concrete slurry, and similarly concrete possessing specific insulating properties may be obtained by varying as required the foam expansion.

It will be apparent that operation of the valve 26 controls the production of foam in and its delivery from the tube 11. As the foam-forming solution and air in proper ratio enter the passage 31 and pass through the passage 25 they are preliminarily mixed and forced into the reduced inlet end of the foam tube 11, from whence the combined air and foam-forming solution passes first through the bead-filled compartment 19 and then through the Raschig-ring-filled larger compartment 20. As the air-solution mixture traverses the bead-filled compartment 19, it is forced to traverse a myriad number of tortuous paths formed by the intercommunicating voids between the beads as the result of which the air-liquid mixture is finely subdivided and so effectively distributed over an exceedingly large surface area as to bring about an exceedingly intimate contact and intermingling of the air and liquid, in consequence of which there is produced foam the bubbles of which are of exceedingly small diameter and highly resistant to rupture. The foam so produced is very stable and ideal for introduction into a concrete slurry. As the foam so produced within the bead-filled compartment 19 of the tube enters the larger compartment 20 thereof, it passes through and about the Raschig ring elements 22 without destruction of its bubble structure, but with such gradually reduced velocity as to finally emerge from the enlarged end of the tube 11 with practically no discharge velocity. The indiscriminately oriented tubular elements 22 serve, conjointly with the gradually increasing diameter of the tube 11, to reduce the velocity of the foam stream through the discharge end of the tube, and also insure such distribution of the foam throughout the cross-sectional area of the tube as to provide for emergence of the foam from the tube in the form of a continuous stream of substantially cylindrical shape.

The rate of production of the foam may be varied as required by simple regulation of the needle valves controlling the flow of air and foam-forming solution to the mixing head, the rate of foam produced being increased or reduced by increasing or decreasing the flow of solution with corresponding adjustment of the air flow to insure silent and continuous production of foam of the required expansion. To check the foam rate it is merely necessary to measure the amount of foam discharged from the tube 11 in one minute. Thus, for a foam expansion of 20, twenty gallons of foam should equal the weight of one gallon of foam-forming solution.

The amount of pre-formed foam incorporated into a given volume of a cementitious slurry of a specific formula will vary, of course, depending upon the ultimate density desired for the final cementitious product. For example, to produce a finished concrete structure having a desired density of 70 pounds per cubic foot as against a normal density of say 125 pounds per cubic foot, experience has shown that approximately thirty gallons of the pre-formed foam having an expansion of about 20 should be incorporated into the concrete slurry for each 100 pounds of cement contained therein. These figures are of course approximate and would be varied as may be required for the production of a final product having certain specified characteristics.

As has been pointed out hereinabove, the incorporation into concrete or other cementitious slurry of preformed foam produced in accordance with the present invention imparts unusual lubricating properties to the foamed concrete mass and so increases its fluidity as to facilitate casting thereof in molds of intricate shape and pumping thereof into forms for quick and economical production of structural elements. Also, because the foam is preformed and is not subject to further expansion, the concrete mix into which the foam is incorporated may be used immediately after mixing without danger of injurious expansion of the concrete in its form or mold.

It will be understood, of course, that the present invention is susceptible of various changes and modifications which may be made from time to time without departing from the general principles or real spirit thereof, and it is accordingly intended to claim the same broadly, as well as specifically as indicated in the appended claims.

What is claimed as new and useful is:

1. The method of producing a cellular cementitious structure consisting of the steps of, preparing a slurry of cementitious material, continuously generating a stable air foam by introducing pressurized air into a foam-forming solution and forcing the mixed air and solution through an apertured barrier, introducing said foam into said slurry as said foam is generated, intimately mixing said foam with said slurry as said foam is introduced to produce a substantially uniform dispersion of said foam in said slurry, introducing said mixed foam and slurry into a form of desired configuration, and allowing said mixture to set and harden.

2. The method of claim 1, wherein the step of introducing pressurized air into the foam-forming solution to cause a volume expansion thereof by forming a foam includes the step of adjusting the relative proportions of air and solution to provide a controllable volume expansion of the solution.

3. The method of producing a cellular cementitious structure consisting of the steps of, preparing a slurry of cementitious material, preparing a foam-forming solution, continuously generating a stable air foam by introducing pressurized air into said foam-forming solution and forcing the mixed air and solution through an apertured barrier, introducing said stable foam into said slurry as said foam is generated, intimately mixing said foam with said slurry as said foam is introduced to produce a substantially uniform dispersion of said foam in said slurry, introducing said mixed foam and slurry into a form of desired configuration, and allowing said mixture to set and harden.

4. The method of claim 3 wherein the foam-forming solution is prepared by hydrolyzing an aqueous solution of proteinaceous material and adjusting its final pH value to about 7.6, filtering and evaporating the hydrolyzed solution to obtain a liquid hydrolysate, adding to said liquid hydrolysate an aqueous solution of ferrous sulfate, stabilizing the resultant hydrolysate with an aqueous solution of calcium chloride hexahydrate and isopropyl alcohol, and finally diluting said stabilized hydrolysate with water in the proportion of at least one part of said stabilized hydrolysate to 50 parts of water.

(References on following page)

References Cited in the file of this patent

UNITED STATES PATENTS

| | | |
|---|---|---|
| Re. 22,816 | Camp | Dec. 10, 1946 |
| 1,717,319 | Rice | June 11, 1929 |
| 1,927,376 | Schroder et al. | Sept. 19, 1933 |
| 1,998,686 | Parsons | Apr. 23, 1935 |
| 2,043,599 | Waldschmidt | June 9, 1936 |
| 2,215,812 | Kaplan | Sept. 24, 1940 |
| 2,282,190 | Jahjah | May 5, 1942 |
| 2,376,122 | Clifford | May 15, 1945 |
| 2,476,306 | King | July 19, 1949 |
| 2,542,364 | Schenker et al. | Feb. 20, 1951 |
| 2,593,008 | Chappell | Apr. 15, 1952 |